(12) United States Patent
Ragan et al.

(10) Patent No.: US 11,784,796 B2
(45) Date of Patent: **\*Oct. 10, 2023**

(54) ENHANCED POST-QUANTUM BLOCKCHAIN SYSTEM AND METHODS INCLUDING PRIVACY AND BLOCK INTERACTION

(71) Applicants: William Perry Ragan, Bluffton, SC (US); Jack Ragan, Bluffton, SC (US)

(72) Inventors: William Perry Ragan, Bluffton, SC (US); Jack Ragan, Bluffton, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/101,487

(22) Filed: Jan. 25, 2023

(65) Prior Publication Data

US 2023/0171088 A1    Jun. 1, 2023

Related U.S. Application Data

(63) Continuation of application No. 17/689,315, filed on Mar. 8, 2022, which is a continuation of application No. 16/797,818, filed on Feb. 21, 2020, now Pat. No. 11,271,724.

(60) Provisional application No. 62/808,624, filed on Feb. 21, 2019.

(51) Int. Cl.
*H04L 9/06* (2006.01)
*H04L 9/08* (2006.01)
*H04L 9/40* (2022.01)

(52) U.S. Cl.
CPC .......... *H04L 9/0662* (2013.01); *H04L 9/0827* (2013.01); *H04L 63/0435* (2013.01)

(58) Field of Classification Search
CPC ... H04L 9/0662; H04L 9/0827; H04L 9/0822; H04L 9/083; H04L 9/0656; H04L 63/0435; H04L 63/06; H04L 63/0428
See application file for complete search history.

(56) References Cited

U.S. PATENT DOCUMENTS

| | | | |
|---|---|---|---|
| 11,334,882 B1 * | 5/2022 | Jameson | H04L 9/3231 |
| 11,356,252 B1 * | 6/2022 | Islam | H04L 9/50 |
| 2015/0229614 A1 * | 8/2015 | Thompson | H04L 9/0656 713/168 |
| 2015/0244520 A1 * | 8/2015 | Kariman | H04L 9/0656 713/168 |

(Continued)

OTHER PUBLICATIONS

Scalalble One-Time Pad—From Information Theoretic Security to Information Conservational Security, by Zhang, published 2018 (Year: 2018).*

*Primary Examiner* — Vu V Tran
(74) *Attorney, Agent, or Firm* — Law Offices of John G. Posa

(57) ABSTRACT

One-time-pad (OTP) encryption systems and methodologies are resistant to cracking, even by advanced quantum computers. In contrast to some purported solutions, the required elements of an unbreakable OTP system are preserved under Claude Shannon's mathematical proof. In alternative embodiments, the invention uses a secure network to reconstitute blockchain systems without the use of asymmetric encryption. Described extensions of these block chain systems are described which enable an entirely new set of applications for protecting privacy, sharing information, performing validations and analysis of data, and creating system actions that are constrained by complex data algorithms.

15 Claims, 1 Drawing Sheet

(56) References Cited

U.S. PATENT DOCUMENTS

2020/0344043 A1\* 10/2020 Komarov .............. H04L 9/0825
2021/0314143 A1\* 10/2021 Conner ................ H04L 63/067

\* cited by examiner

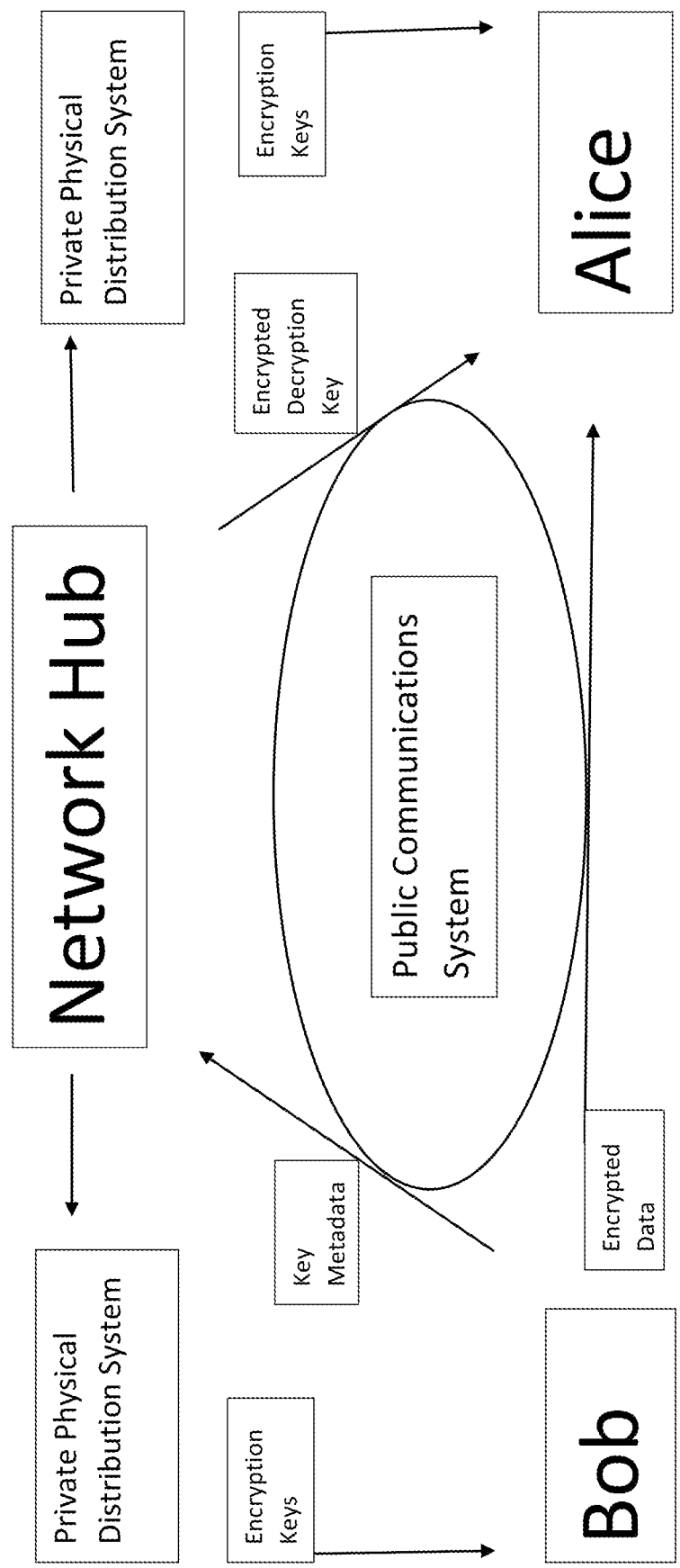

ENHANCED POST-QUANTUM BLOCKCHAIN SYSTEM AND METHODS INCLUDING PRIVACY AND BLOCK INTERACTION

REFERENCE TO RELATED APPLICATIONS

This application is a continuation of U.S. application Ser. No. 17/689,315, filed Mar. 8, 2022, which is a continuation of U.S. application Ser. No. 16/797,818, filed Feb. 21, 2020, now U.S. Pat. No. 11,271,724, which claims priority to, and the benefit of, U.S. Provisional Patent Application Ser. No. 62/808,624, filed Feb. 21, 2019, the entire content of all related applications being incorporated herein by reference.

FIELD OF THE INVENTION

This invention relates generally to encryption and, in particular, to encryption systems and methods based upon one-time-pad (OTP) key generation, distribution and use.

BACKGROUND OF THE INVENTION

The modern Internet based economy is built on the security of public key/private key encryption systems. These systems rely on asymmetric math problems that are hard to solve, but easy to confirm via the correctness of a solution. A common encryption problem is the prime factorization of a very large number. Solving these types of problems requires tediously testing every possible solution until the answer is randomly found. Using conventional computers, cracking this encryption requires incredible amounts of time, expense, and computational power—making it impractical for the typical hacker. The current systems, such as those used for SSL (Secure Socket Layer) in an Internet browser, are very convenient and cheap to maintain and use. Without this technology, it would not be safe to perform financial transactions online, and general user privacy would be compromised.

Decades ago, a new type of computer, a "quantum" computer, was envisioned that would exploit the quirks of quantum mechanics to solve brute force problems almost instantly, by examining all possible solutions simultaneously and settling on the correct answer. About 10 years ago the first proof of concept quantum computers were developed in the lab. Several years later, a company called D-Wave introduced the first commercially available quantum computer. Early versions were essentially high cost novelties ($10 M each) that would allow companies to begin developing algorithms that might become financially viable later. In 2018 D-Wave opened a cloud computing service to the public using its latest generation system. As commercial services are now opening using D-Wave's cloud, there are indications that the technology is crossing the threshold to economic viability. An exponentially faster quantum system will be released by D-Wave shortly. Recently, IBM and Regatti have also released quantum cloud computing using a different technology.

Quantum computers hold great promise for mankind by optimizing the efficiency of complex systems like air traffic routes, aiding the design of pharmaceuticals and machinery, and enabling better artificial intelligence—to name just a few applications. This same power also threatens to destroy the Internet economy by breaching the asymmetric encryption systems used today. The prevailing wisdom is that for now, the length of encryption keys can simply be increased periodically to keep up with the increasing power of quantum computers. This is true to a point. Key length has been increased successfully to compensate for gains in conventional computer capabilities. There is also broad recognition that eventually quantum computers will win out and a new system of encryption will have to be adopted. An additional problem in the interim, is that old messages or transactions could easily be decrypted by next year's quantum technology.

Once quantum computers have reached sufficient power to render asymmetric encryption unsafe, Internet purchases with credit cards will become unsafe. All online banking will stop. Sensitive personal or corporate information could not be transmitted with privacy. Remotely controlled machinery as well as autonomous planes and cars could be hacked into by terrorists. All crypto currencies (such as Bitcoin) rely on asymmetric encryption to maintain their integrity, as do all other current blockchain applications. Much is at stake in replacing current encryption methods in time to prevent a nightmare scenario.

It is well known that a One Time Pad (OTP) encryption system is mathematically impossible to crack, regardless of brute force computing power. Therefore OTP is resistant to cracking by a quantum computer. OTP involves encrypting a message with an XOR logic operation using a random key that is of identical length to the message. Both the sender and receiver use the same key to encrypt and decrypt the message. If the key remains secret, is truly random in nature, and is never reused—then the security of the message is assured. OTP was used extensively in WWII for secure military communications and continues to be used for highly sensitive government and corporate data. Various software programs can be found on the Internet enabling OTP communication between two users. These applications typically require users to physically meet to share a key.

While fully secure, OTP presents practical issues. First of all, keys must be the same length as the message and never reused. This necessitates a large supply of encryption keys that must be securely delivered beforehand between senders and receivers. A different set of keys must exist for all combinations of senders and receivers. Additionally, the keys must be truly random—so pseudo-random number generators cannot be used safely. For these reasons, OTP has been pushed aside for public key/private key encryption systems.

It is recognized in the trade literature that adopting a "star network" would overcome the problem of connecting every possible combination of sender and receiver in a network. A communication could be sent to a central encryption hub, decrypted, and then re-encrypted and sent to the final recipient. This allows every user of the network to maintain encryption keys with the hub only, and still send secure communications to anyone in the network—without any prior contact. This type of system already exists throughout the public telecom network and Internet, as different transmission protocols encrypt and decrypt data to deliver it between disconnected senders and receivers.

In fact, methodologies for using a hub to administer an OTP network have been described and patented. Till now, these systems have contained two key issues. Systems where the hub brokers the messages, rely on the security of the hub—physically, electronically, and in terms of employee integrity. As the volume of financial and other data moving through such a hub increases, the payoff for a bad actor to compromise it becomes enormous. A hub handling financial transactions for millions of users could have billions or even trillions of dollars of sensitive data at stake—in a single location. A chain is only as strong as its weakest link, and the practical difficulty of physically securing such a location would be enormous. Additionally, users of the network would by nature be placing their trust in the administrators of the hub, and would be giving up privacy in this regard.

Another critical problem in described hub systems is that encryption keys and or messages are deleted to minimize long term risk of physical breach. Such a protocol could be compromised and replaced by a bad actor, without the knowledge of users or even the administrators. While the deletion protocol was successfully carried out, the system would present a threat to the national security of the United States or other countries. Terrorists would be able to use such a communications network to communicate securely without interception by the military or law enforcement. Since 9/11, western nations have recognized the need to balance personal privacy and protection from hackers, with an ability for governments to track terrorists in extreme situations. It is unlikely that western governments would permit wide scale use of a system that does not maintain that balance.

SUMMARY OF THE INVENTION

This invention, referred to herein as "Quantum Lock™," resides in systems and methodologies for using quantum resistant one-time-pad (OTP) encryption in a way that resolves the critical problems outlined above. The system preserves the required elements of an unbreakable OTP system (under Claude Shannon's math proof), which some described systems in the prior art do not. Additionally, the invention uses a secure network to reconstitute blockchain systems without the use of asymmetric encryption. Extensions of this block chain system are described which enable an entirely new set of applications for protecting privacy, sharing information, performing validations and analysis of data, and creating system actions that are constrained by complex data algorithms.

BRIEF DESCRIPTION OF THE DRAWINGS

FIG. 1 is a block diagram that illustrates a preferred embodiment of the invention.

DETAILED DESCRIPTION OF THE INVENTION

Part 1:

In accordance with the invention, random One Time Pad (OTP) keys are generated using a true random number generator and placed on serialized USB flash drives, discs, hard drives, or another data storage device. The flash drives will be sold in stores, automated kiosks, or purchased through mail order. Standard packaging techniques can be used to encapsulate the memory devices to indicate physical tampering. The automated kiosks would allow recycling and replacement of old OTP key storage devices. A universal or serialized physical or electronic marking would allow the kiosks to identify old devices and accept them—providing a recycling credit towards the purchase of new keys. Alternately, a credit system could be established by which a human confirmed validity of returned devices. A new device already fully loaded could be obtained instantly, as in a first-time purchase. Alternately, the kiosk could load new keys onto the returned device—with a passcode system allowing the user to return later to pick it up after the download is complete. An alternate feature allows downloading onto a reused device, while leaving existing OTP keys (or unrelated files) intact. Users could purchase different volumes of OTP keys. Another embodiment of the system of recycling existing devices would incorporate some human involvement in the download process using a standard computer or custom device.

For the system to be fully secure under Claude Shannon's proof, the encryption keys must be completely random. The pseudo random generators (utilizing a math algorithm) found in many commercial computers, are not truly random. A preferred method for obtaining random numbers is through a physical apparatus that exploits quantum randomness. An example of this is the Quantis device made by IDQ. The servers generating ciphers for distribution could use the Quantis or a similar product to achieve true randomness.

The key storage devices (KSD) would be uploaded with OTP keys and identifying marks (showing it originated from Quantum Lock) at one or more centralized facilities. These facilities would either generate streams of truly random sequences or obtain them from other facilities with this capability. Transmission of OTP keys between facilities would occur via physical movement of memory devices, or via electronic links using OTP encryption. Facilities might periodically physically transfer very large memory devices containing OTP keys for the purpose of establishing a link between facilities. Data could then be transmitted between facilities over Internet or telecom networks later, without the use of a physical delivery service. KSDs would then be physically transported to retail outlets, kiosks, or delivered directly to recipients. Another embodiment would be for kiosks or retail locations to have the capabilities to generate the OTP keys on site. In this case, copies of the keys would be physically transported (or send back via OTP encryption) to a central facility. Another embodiment would permit download of keys onto a storage device not acquired from Quantum Lock; in this scenario no recycling would be permitted. Still another option for the kiosks would be to enable wireless download of keys onto a cell phone, computer, or other electronic device.

Software to manage the Quantum Lock system would be distributed on the KSDs, on a separate storage medium, or downloaded directly over the Internet or telecom network. The software would manage the OTP keys, carry out encryption and decryption, interface with other software programs on the user's computer, and assist the user with long term indexing, deletion, and archive functions of already used keys sequences. The software could be publicly available or might be restricted to subscribers of the Quantum Lock system. Alternately, the software could be customized for each user. The software and or version updates might themselves be distributed only via physical transport or OTP encryption to prevent public examination.

Copies of distributed OTP keys are stored in a server hub and associated with a KSD and/or a user account. The hub would function as an exchanger of keys between senders and recipients, and as a long-term storage facility of keys. Multiple hubs might be employed to reduce communication latency over large geographic areas. Multiple hubs might also store redundant copies of keys to protect against physical damage to a single facility (by fire, flood, etc.). Redundancy could also be used to balance load the volumes of data being transmitted by a single facility, and to keep the network functioning in the event of a temporary failure at a single facility due to power loss or another technical failure. Redundancy of keys might exist on multiple servers at a single hub facility, as well as non-hub facilities that do not communicate with users and are used only for data storage.

Users might have the ability to communicate with all hubs, a single hub, or a subset of hubs.

Facilities storing keys would require strong physical and electronic protections. Internet or telecom access to a hub would be necessary for functioning. Servers containing copies of keys might be separated from those with access to the outside world. They could communicate over a port governed by software creating a restriction around the port that allows transmission and retrieval of keys only—and provides no access to the server operating system. An embodiment of this would physically "gap" the servers, and a memory device would physically transfer communication between the servers.

Servers would store OTP keys for varying lengths of time based on the desires of specific users, universal system settings, or based on government mandates. Expended keys might be moved after use, and redundancies could be increased or decreased over time. Users would be able to request copies of old keys (such as in the event of losing a KSD at their home or business). This would allow them to view an encrypted file in their possession that they could not access because of losing the key. Copies of old keys could be sent out on a new KSD, uploaded onto an old KSD with adequate free memory space, or transmitted via OTP over the Internet or telecom network. Requests for old keys could occur electronically with security measures such as passcodes, questions, identifying data such as social security numbers, or biometric security. Alternately, a human could be involved in fulfilling such requests and verifying identity in the same way a bank teller might. Additional precautions in releasing old copies of keys might include sending KSDs only to the address on file of the user. In the event a valid judicial warrant was presented for a governmental agency to acquire a key, the requested copies could be delivered through similar means and with similar verification of validity.

FIG. 1 is a block diagram that illustrates a preferred embodiment of the invention. When a user (Bob) wants to send a communication, the software uses the public Internet to send to the hub the address of the message recipient (Alice), the beginning and end location of the cipher (alpha) within the full body of cipher contained on the KSD, the serial of the KSD, and a unique message identifier created by the software. The hub server then retrieves the full cipher of that particular KSD from the database based on the serial number, and identifies alpha as a subset of the full cipher based on the beginning and end points specified. Alpha will be the same length as the message (gamma) to be sent between Bob and Alice and will never be reused. Then the server will create a cipher (beta) with which to encrypt cipher (alpha) for secure transmission to Alice. The server will pull the last cipher endpoint from Alice's current KSD cipher and then create beta by using enough subsequent bits to match the length of gamma. An encrypted message theta is created by encrypting alpha with beta (via standard OTP XOR logic), and theta is then transmitted via public internet to Alice. Alice also receives the beginning and end points of the cipher on the KSD, the KSD serial, Bob's address, and the message identifier. Bob is then able to send message psi to Alice, which is gamma encrypted via alpha (using standard OTP XOR logic). Alice's software decrypts message theta (from the hub) using beta to retrieve alpha, and then uses alpha to decrypt psi into gamma. Alice can now see Bob's original unencrypted message.

The address of the recipients could be an email address or another type of user identifier that exists apart from the Quantum Lock system or is assigned by the system. The messages or data transmitted in the Quantum Lock system could be sent via email, FTP, HTTP, another Internet protocol; or via a non-Internet telecom network, or via direct landline or wireless transmission using sound, photons, electromagnetic waves, or particles; or via physical transport on a storage medium.

The software may manage multiple KSDs to create a master cipher for a user that constitutes the sum of all ciphers. This would allow the end of the key on a KSD to be attached to the beginning of the key on another KSD for efficiency. Keys from multiple KSDs might also be combined and copied onto other (possibly larger) storage devices. In this embodiment, a header at the beginning of a master file would denote the sizes and serials of the sub cipher keys compiled together, as opposed to any marker within the cipher. Should a marking sequence be used inside a master cipher to denote the beginning of admin data, this would itself violate the integrity of the OTP system as that sequence would have to be purged from random keys generated.

The software and hub would also use industry standard mechanisms to achieve load balancing or rerouting between hubs. Error protocols would be created to account for transmissions that are not completed, so that cipher markers and synced, and messages reprocessed when necessary. Admin data stored locally by the user software could also be backed up for redundancy at ON Lock hubs. Back up of encrypted messages might be stored at a cloud storage facility unassociated with the hubs—to protect the separation that is necessary to the system's integrity.

The software could encrypt messages with the appropriate cipher and add a file extension to the name such as ".qlock". A header protocol would allocate a fixed length at the beginning of each file for admin data such as the message identifier, sender, and recipient. The software would match this data within a message to an index of ciphers that is compiled over time through communications with the hub network.

Encrypted files could easily be sent as attachments to email. Over time, interfaces with other software programs (and electronic hardware devices) could be developed. For example, all Internet browsers contain capabilities for asymmetric encryption (HTTPS). A so-called plugin or addon seamlessly replacing the current encryption with an interface to the Quantum Lock system would allow financial transactions to continue on the Internet, unimpeded by the advance of quantum computers. Entirely new communication software using Quantum Lock could also be developed. Hardware devices using Quantum Lock could also be developed that sit between an electronic device and the public Internet or telecom system (such as a copy or fax machine, computer, router, drone, or another machine or device controlled remotely). Such a device might encrypt all data coming in or out of the protected device, using the Quantum Lock system; and route all data directly through Quantum Lock hubs. This could be done without any knowledge of the proprietary workings of software or hardware on the other side of the barrier. For example, Quantum Lock routing device could be attached to a military drone or an autonomous vehicle linking it back to the authorized operators. This could avert a major loss of life or property by preventing a breach by a terrorist or criminal.

The Quantum Lock system allows a message to be sent with full security over the public Internet without users physically or electronically having to directly exchange the encryption key. This is vastly more efficient than having to maintain a different cipher for every possible message recipient. Additionally, the server never handles the message, so privacy and security related to the hub or network administrators are not a concern.

Hackers could not brute force decrypt any intercepted message that is "Quantum Locked", even with a quantum computer. They would have to obtain a copy of the encrypted message from the public Internet as well as the key from the hub facility. This would provide extraordinary privacy and security safeguards to private citizens and businesses. The Quantum Lock system would also protect against hacking by rogue foreign nations. However, governments typically can wiretap their own telecom and Internet systems. Therefore, the US government (or other nation) could obtain an encrypted message via wiretap (as the hub would not have it) and then decrypt it by presenting a valid warrant to the hub. This unique system protects the balance of personal privacy with national security, while preventing an economic upheaval or collapse from the advent of quantum computers.

Part 2:

As mentioned earlier, the demise of asymmetric encryption will make current blockchain applications and cryptocurrencies essentially non-functional. A novel approach to reconstitute blockchains is possible building on the Quantum Lock encryption just described. The system and method described herein represent a complete revision, not merely a swapping of encryption schemes. However, it achieves similar objectives without the possibility of hacking by quantum computers. An immediate advantage over current systems is that the computational power required for functioning is minimal. Bitcoin and other crypto currencies, while still representing a very small portion of the world's money supply—already use more electricity than a small nation. This represents an inherent economic inefficiency and would eventually create environmental concerns as well.

Blockchain technology is revolutionary in that it creates a distributed storage, processing, and verification system—that is "trust minimized". Rather than relying on a single institution to ratify a transaction or confirm information, blockchains provide public ledgers or histories. Multiple, possibly random, parties work together to add to this ledger by creating blocks of newly verified information that is built on and linked to already trusted blocks in the public ledger. Error checking mechanisms exist to rescind bad blocks or bad chains that are later found to be inconsistent with the public knowledge. All trust in current blockchains is placed in the security of the asymmetric encryption systems built into the blocks—the blocks are typically tied together through a mathematical algorithm called hashing. Due to this, the advent of powerful quantum computers might make trust minimized blockchains, the least trusted mechanism for electronic or remote transactions.

In a "Quantum Locked" blockchain, blocks of information are "chained" together using the Quantum Lock OTP encryption system rather than public/private key asymmetric encryption. While a public ledger might be generally available unencrypted, using the blockchain system for verification or creation of blocks would require being connected through the Quantum Lock hub system. A block contains new information that is related to a prior block (or chain of blocks); except for a "genesis" block. An example would be an automobile title transfer. The genesis block in this example would be created when the car is manufactured and designate the factory as the owner. As the car changed hands, new blocks would be added to that chain showing the current and previous owners, and possibly many other pieces of information such as repairs and accidents. A "terminus" block would be the final block in a chain (perhaps when a vehicle is crushed); no further blocks could be added.

Each block would have required pieces of information and might have optional fields as well. There might be formatting requirements for the fields based on the application. When a sponsoring association establishes a Quantum Locked Blockchain Network (QLBCN), it will have options for establishing these parameters. The parameters could be changed over time, and so a block might have a field identifying the protocol version that was used during creation. At the bare minimum, a block would contain a network id, a block id, timestamp, a pointer to the prior block, pointers to the "VN Nodes" (VNs) of the old block, pointers to the current VNs, pointers to the current owner of the block, pointers to the next block (when established), pointers to the next block's VNs, a field noting genesis or terminus blocks, and one or more data fields. A VN is an entity responsible for storing and confirming data for a specific block, using encryption keys. This is an important concept and will be described in more detail later.

It is understood that some fields could be combined using a formatting protocol. Additionally, or alternatively some of the field data for a block could be stored in one or more indexes and referenced with the block id. It is also understood genesis or terminus blocks would naturally not reference prior or future blocks based on their status.

An example of a simple block for our automobile title network would be as follows:

Block Network: 22579
Block ID: 2
Block Protocol: Version 5.1
Chain Status: Mid Chain
TimeStamp: 01/24/19 08:00 GMT
Prior Block: 1
Prior Block VNs: For Buyer—847292, For Seller—283382, For Association 293820
Block Owner: 27382
Block VN: For Buyer—962145, For Seller—225497, For Association 328495
Next Block: 3
Next Block VNs: For Buyer—578213, For Seller—4456812, For Association 2548
Data: "XYZ Car Factory transfers red SUV, serial 83729289, with odometer 87 miles, to Bob's Car Dealership for $32,100."

Note that the IDs in the fields can be alphanumeric or descriptive text or both—however they must serve as unique identifiers. Note also, that some QLBCN's could permit branching or merging of chains. In such cases, the additional prior or future block data would be referenced. For example, a blockchain for land titles might need to account for parcels of land being split apart or consolidated.

Associations creating QLBCN's would have an option to create tiers of VNs with different levels of permission. They would also set the criteria for becoming a VN at a certain level and exiting or being removed as a VN. Examples of VN levels might include the rights to create genesis or terminus blocks, verification of existing blocks only, creation of new blocks, and archival storage of blocks. In some instances, a VN might need to be a law firm or have some other accreditation, or perhaps some verification functions could be done by any random public entity. A system of compensation would also be chosen for VNs completing different functions (such as a penny for each block verification performed). Archival parameters could be used to limit the size of the active public ledger or optimize processing functions. For example, active chains might be limited to 10 blocks with older blocks referenced in the archive ledger(s).

Each block would have at least two categories (but typically three or more) of VN "chains" responsible for ratifying the legitimacy of the block data. One or more chains would be categorized as VNs chosen by (and representing the association or public interest). A set of chains would be categorized as VNs representing each party with involvement in a transaction or with the data in a block. So title transfers for currency or physical assets (like cars or land) would typically have two sets of VN chains—one for the buyer and one for the seller. A blockchain ratifying multi-lateral peace treaties might have many categories of VNs, representing every interested party.

The nature of the OTP system used in Quantum Lock ensures that the encryption keys held by VNs can not be cracked by brute force or quantum computation. However, the novel system of VN chains representing the various interested parties, serves to prevent bribery, corruption, or collusion in falsifying blocks. While the encryption algorithm will be described shortly, suffice it to say now that an adequate level of positive verification must be obtained from all categories of VNs before a block can be created or verified later. Each chain of VNs will work in sequence to confirm or deny a request. The entire chain of VNs must provide a perfect affirmation, or the chains "vote" will be considered a denial. By allowing multiple chains of VNs in each representation category—not all chains would need to affirm a block in a given request. This would allow for a broken chain because of technical malfunction or slow response by a specific VN.

The QLBCN would have parameters set on how long the VN chains would be, and the thresholds for system verification in terms of the number or percentage of chains that must respond to ratify a given request. Error protocols would also be established for dealing with situations where both positive and negative votes are cast, and for replacing corrupt chains. The longer the VN chains are and the more required to respond to a request, the more secure the network. This added security also increases the potential processing time for request verification. A network can be designed to create the balance of factors that is best for the application. Note that different levels of security might be required for different sized transactions or blocks of varying importance. For example, a block recording the purchase of a cup of coffee might only have three VNs per chain, while a billion-dollar stock exchange might require 100. It will be demonstrated later, after the encryption protocol is explained fully, how a carefully designed QLBCN would make it fantastically difficult to forge false blocks—achieving a truly distributed, trust minimized network.

The public information of the block would contain only the first and last VN in each chain. VNs connecting the endpoints would only be known entirely to the owner of the block. This adds a layer of security by hindering bribery of VNs. A VN would also be known to the VN just prior to them on the chain. Each VN would maintain a secret OTP key with the owner of the block, identical in length to the block. When a system user wants to confirm ownership of a block, it will send the block to the starting VN in each chain. The VN then encrypts the block with the secret key and transmits it to the next VN. The next VN performs another XOR operation on the data with their secret OTP key, and sends the data on. The final VN in the chain, knowing it is the endpoint, sends on the encrypted block back to the user making the query. If the chain has 11 VNs in the chain, the block will be encrypted by XOR operation 11 times. The owner of the block will be asked to release the composite XOR key for the entire chain, back to the user. The user will then decrypt the garbled data from the endpoint of the VN chain with the composite key from the owner. If it matches the block—then this indicates that the claimed owner truly owns the block as verified by that chain. Each chain will be queried in similar fashion, and based on the rules of the network, a threshold of agreement can be reached.

An immediate issue that presents itself is that, once a single query has been run; the composite OTP key for each VN chain can be acquired. This would allow a bad actor to impersonate the owner of the block. To overcome this, the secret key held by each VN and the owner; can be replaced for each query. As a practical matter, a set of keys could be put in place ahead of time to minimize delays in execution later. For example, when a block is created 100 keys could be put in place between the owner and each VN. A counter can be incremented with each query and owners and VNs in each chain could move to the next key in unison. Once the cache of keys is running low, then another block of keys can be transferred.

Another embodiment of the system would utilize hidden VN keys that are lesser or greater in length than the block length. Another would specifically use lesser lengths which add up to the full length of the block, and each VN would encrypt a portion of the block as it is passed along. In another embodiment the keys would be added together or used to encrypt the prior key in the VN, without performing an action on the block data (the key coming from the end of the VN chain would simply be compared with the secret key of the block owner).

It is assumed by default that all key transmission and all communication in the QLBCN is done through the Quantum Lock system to ensure security of the data. Another embodiment of the system would permit the use of an alternate OTP system that adheres to or falls within Shannon Clark's proof. Another embodiment would permit the use of transmission via quantum entangled particles such that tampering would be impossible or detectable (small scale systems have been developed to date). Alternately, a QLBCN could utilize another form of "post-quantum" cryptography that was mathematically proven to be unbreakable (or difficult enough to satisfy the security needs of an application) by quantum or brute force computation.

While the QLBCN can not be breached by malicious decryption, in theory various nodes in the distributed network could be physically breached or bribed. The sheer number of VN nodes involved in a well-constructed network would minimize this risk. One potential point of attack would be to bribe the published end point in a VN chain, while impersonating the block owner. The end point VN could replace the data from earlier in the chain with data that would match a fake hidden key being presented by the bad actor. One solution to addressing this is to have rating systems for the trustworthiness of entities operating a VN node. For example, a well-established law firm with a security team might be given a higher rating than an individual that has just begun using the system and verifying transactions. Published VNs at the beginning and end points might be restricted to a smaller pool of highly trusted entities.

An alternate method to address the above concern, would be to publish only the beginning VN in a chain. A user submitting a query would simply receive the response back from the end of the chain and would not know who to expect it from. This eliminates any published VN from returning a fraudulent data set to the user. However, by not knowing the endpoint of the chain; it is conceivable that the beginning VN could collude with a fake VN (one not assigned to a block) and have them send a terminating chain data set to the user that matched a fraudulent key presented by a fake owner.

If this type of collusion and fraud were a concern, a checksum system could be used to verify the identities of the VNs in a chain returning hidden keys or block data encrypted with the keys. In this scenario, each VN in the chain would communicate back directly with the user making the query. The user would match the checksum in the public block data with the VN identities to ensure that each VN was a legitimately assigned to the chain for that block. This would prevent a bad actor from compromising, for example, 15 random VNs (out of 10,000 attempts)—and then presenting them as a fake VN chain. The system identifiers for the VNs would not match the checksum unless the bad actor was incredibly lucky. Note that if the VN nodes in the network are all publicly known, then in some cases a brute force or quantum computation on the check sum could reverse engineer the correct combination for a block. Therefore, in this embodiment the checksum algorithm relative to the methodology for assigning identities should allow for numerous potential combinations within a given checksum but the set of those combinations should be a very small fraction of all possible combinations of VNs. This preserves the secrecy of the VNs (so they can not be targeted for compromise) and prevents presentation of a random set of compromised VNs as a chain. It should be noted that this variation would logically require the VNs to be changed after each query, and the checksum changed in the public data of the block. Checksums might also be used to describe the content of a data block, or of keys being transferred—as part of standard data transmission protocols.

In many of the variations described above, it may be beneficial to periodically alter the VNs assigned to a block. This could involve changing only the secret VNs, or might also include the published VNs. Reconfiguration might be triggered by a query on a block, or could be done periodically system wide based on a time interval. The ledger of public blocks might provide for changing certain aspects over time, such as a checksum or a VN list, but most likely making these changes would require creation of a new dependent block. A QLBCN might be configured such that new blocks are continuously being generated at rapid time intervals—for example every second. If a block had no change of ownership or now new data, it would simply spawn a cloned dependent block with a new set of VNs. Such a system is feasible given the modern speed of communication and computation. The difficulty of compromising the integrity of a vast network of continually changing VN nodes, protecting a block, would be significant.

Maintaining the secrecy of some of the VNs would make it very difficult to compromise all the nodes protecting a block—because they would be unknown. An interesting application of secret VNs is that it would be possible in some variations for them to store data without knowing the content (if both the block data and the block id itself were arrived encrypted). This might have applications of its own. As a practical matter, technical issues such as data corruption or communication latency might be greater issues than wide spread fraud or collusion. A trusted VN's long term business prospects would be placed in jeopardy by attempting to cheat the system, in the same way that various licensed professionals would lose their operating license for perpetrating a single violating scheme. That said, another embodiment of a QLBCN would be to dispense with all secret VNs and publish the identities in the public block. Another configuration would be to dispense with any categories of VNs (representing different interests in a block), or to dispense with any chains of VNs. Conceivably, one could obtain a trust minimized, distributed network by simply having a very large number of VNs assigned to a block; and creating appropriate rules for assessing their responses to a verification query. For example, once most assigned VNs confirm a data set, with no negative responses, then the data is considered validated.

It is intrinsic to blockchain systems, that the older a block is in the public ledger uncontested, the more trustworthy. A QLBCN would operate on this same principle. New blocks can be linked or "entangled" with old blocks by having the owner of a block exchange hidden keys with the VNs and or owners of previous blocks in the chain. This would prevent someone from presenting a completely fake block (not showing up in the ledger yet) and gaining validation through a set of fake VNs. A thorough query would validate the keys to the purported VNs of the new block—but also those in the old parent block which are listed in the public ledger. Different levels of investigation might be carried out based on the importance of the block and the intended interaction. For example, negotiations to purchase an item might begin with a simple query of one or two levels of the blockchain, whereas consummation of a new block showing ownership transfer might require full validation back several levels. Each network could create their own specifications for this. Naturally, in the event an entire chain of blocks was presented contrary to what was propagated (or two diverging versions of the public ledger were propagated) then a pre-established system of forensic investigation would need to be carried out to correct the ledger.

Choice of VNs is an important concept in a QLBCN. If VN categories are being used to represent the interests of different parties, then those VNs might be selected by that party. These might be chosen randomly within a grouping of VNs that the party trusted. Generally, the association building the network would want to assign random VNs to represent the public interest. It is also possible that all VNs for a block would be completely random. The randomness adds a significant amount of security to the system. Ensuring that true randomness is in play would be important in ensuring that an elaborate system of fraud was not created by compromising the verification system itself. Many mechanisms could alleviate this concern. Third party entities could exist to facilitate VN assignments if all parties acknowledged their independence. Each interested party could present a series of keys or numbers that are then added together to appoint VNs (such that no party could influence the outcome). The parties could agree to accept a publicly streamed data value at a specific future point (such as a stock ticker or broadcasted stream from a random number generator). This problem is certainly not unique to QLBCN, but ensuring that it is addressed in network construction is important.

Over time, VNs might withdraw from a network or be removed. As described above, some embodiments of a QLBCN might call for changing VNs of a specific block over time. This presents a problem in that public data for a block must necessarily change. As to VNs simply leaving a network, this could be resolved by making a VN identity (or address) permanent. When a VN left, their identity would be assumed by a new entity. A more robust solution would be for blocks in the public ledger to contain a multi-dimensional array showing the current VNs, as well as a full history. This might include the timestamps of changeovers and detail changes to the VN configuration (such as changing the length of a VN chain). Another embodiment would be to store the VN data in a network of redundant centralized hubs that are recognized for independence. Such a hub might use an internal protocol like the one described above for Quantum Lock encryption hubs, whereby it would not be possible to compromise the operating system via the Internet. Alternately, the VN data could be stored in a distributed public ledger. Separation of this ledger from the regular blockchain ledger might be advantageous as the blocks in the regular ledger would not be changed (only added), while the VN ledger would be continually expanding even without the addition of new blocks.

A QLBCN must establish a mechanism for the dissemination (and correction when necessary) of the public ledger. This process could resemble methods used in current blockchain networks. Current blockchains typically distribute the ledger without any security or use the same type of asymmetric encryption that links the blocks. Ideally, a QLBCN might choose to distribute the public ledger via Quantum Lock or another "post-quantum" cryptography method. This could help prevent temporary localized corruption of the ledger, and additionally allow for private blockchain networks only accessible to a select group.

An additional security option that could be implemented to protect against false blocks (being presented as new blocks), would be to send a broadcast query to every single VN in the network. The real VNs of a block would respond invalidating the credentials of the fake block (others would ignore it). The downside of this mechanism is that for large networks the volume of communication and computation would be significant.

In yet another embodiment of a VN configuration, the VN chains would branch out either through a prescribed pattern or randomly. The branching might decrease latency in the system as a larger number of VNs could be involved with fewer levels. A random branching pattern might give each configuration a unique signature like that of a snowflake. If the unique VN configuration were communicated secretly with parties related to prior blocks, this could serve as a rapid preliminary way of confirming a new blocks validity without checking exchanged keys between parties in the new and old blocks.

Another security feature that could be added to a QLBCN would be for communications by VNs or by all parties to be sent through an anonymizing hub. If a VN configuration involved hiding some VN identities, this would prevent their unmasking through monitoring for communication traffic at the time when a large transaction was known to occur. This would require a bad actor to use surveillance or wiretapping of some type. Another measure that could make it difficult to match communications with known transactions, would be for all VNs to send messages only at specific time intervals.

The security of the public ledger could be enhanced by having designated nodes that help store and distribute the ledger. These nodes could perform a verification query on all new blocks when they are receiving. Smaller nodes or users could place trust in ledger updates or copies that are cross checked against multiple nodes that have performed verification. Ledger nodes should cross validate their copies of the ledger frequently with as many other nodes as possible, perhaps changing who they check with at each validation. This will help uncover corruptions to the ledger rapidly.

If there are multiple owners (or stakeholders) in a block, then keys from each would be held by the VNs. There might be complex rules for getting approval from multiple block owners to perform an action (such as creating a new block transferring ownership of an asset), or simple unanimous approval may be required. For example, transferring a block of cryptocurrency might simply involve verifying the identify of the block owner through the secret keys, whereas issuing new stock in a corporation might require the approvals of most shareholders and certain key officers. Part 3 describes a novel mechanism for organizing complex validation rules in the system.

A QLBCN will grant VNs different rights or roles, as stated earlier. The permissions needed for new block creation will be set as well. There may be different rules for different types of blocks (or blocks representing different types of data). Designated VNs given the rights to create new blocks would act as the intermediaries between the new and old block owners and VNs. They would be tasked with ensuring that the rules of block creation and VN configuration are followed. After a new block is created, and all VNs and secret keys put in place—the block would be pushed out to the public ledger.

Many combinations of the different embodiments described above could be used to construct a QLBCN. The optimal configuration would depend on the nature of the application and operating environment. All configurations contain the following advantages:

- They cannot be compromised via brute force or quantum computation
- Trust is not placed in the difficulty of a solving a single algorithm
- Future mathematical or computational advances will not compromise the system
- As with current blockchains, trust is not placed in a single authority
- As with current blockchains, data is redundantly stored in public ledgers which are built over time
- The history and chronology of data can be verified the same as in current blockchains
- Data or asset values can be restored even if a single passcode or key is lost
- Security against fraud or hacking can be adjusted by the design of the VN configuration—the number of VNs, their independence and randomness, the secrecy of VN identities, and changing VNs all contribute to improving security
- The exchange of secret keys between parties related to a block with parties related to prior blocks in a chain, allows the transference of trust over time like the way the hashing process works in current blockchains
- The ability to have VNs representing the interests of different parties incorporates a time-tested legal paradigm into the world of blockchain Part 3

QLBCN's can be extended to enable a whole new set of applications that broker privacy and information sharing. One of the greatest problems of the digital age is protecting personal data, while having the ability to easily share it selectively as desired. Companies collect vast amounts of personal data in exchange for free services. A typical American household may have all Internet traffic, physical travel, financial transactions, phone conversations, email, and even personal discussions in their home—recorded and analyzed to create an ever more accurate consumer profile. In theory, this astonishing relinquishment of data is being managed by impersonal devices—but what guarantees are really in place that this is always the case? Along these lines, academic or medical institutions have legitimate needs to tabulate statistical information and must try to do so without compromising individual privacy. Auditing financial transactions or other types of actions is often necessary for managing business relationships or ensuring regulatory compliances.

Four key extensions of QLBCN's permit all the above issues to be addressed. The first is the concept of "Eigenblocks" and "Eigenfields". An Eigenfield is a field of data in a QLBCN block that performs an algorithmic function on all or part of the general data in a block (for example information on a car title being transferred, not block ids or VN addresses or other technical data needed to maintain the network). The concept is essentially borrowed from the Eigenfunction of quantum mechanics which is used to parse out a specific characteristic of a wave function.

An example of an Eigenfield might be the fuel economy of a vehicle in a car title transfer QLBCN. Another example might be the debt to income ratio of an individual. Still another might be whether someone had one of 13 genes which created a high risk for a specific disease. Note that in each of these examples a vast amount of unrelated data might be contained in the general block (such as a person's entire DNA sequence). Also note that many combinations of related data might exist to produce the value in the Eigenfield (such as the debt to income ratio)—and yet would be unknown through the Eigenfield.

An Eigenfield might be based on an algorithm that is unchanging over time, but it might also be time dependent—such that future blocks in a chain with the same data might produce a different value in an Eigenfield. An Eigenfield might also be based on data external to the current block, and the algorithm might be referenced elsewhere, or data points used in the algorithm (such as what genes cause cancer) might be referenced from elsewhere. Generally, it seems that if an algorithm for an Eigenfield changed, this data should be reflected in a new "cloned" block of the same data so that both operators on the data with timestamps have a historic chronology recorded. However, an alternate embodiment might permit dynamic Eigenfields. Eigenfields would generally be processed through the verification and OTP encryption process of the QLBCN the same as the other fields, but an alternate embodiment might separate them.

An Eigenblock is a block that performs the function of an Eigenfield on an entirely separate block, or a set of blocks. An Eigenblock might be used to aggregate data of a specific type into one place or used to perform statistical or computational analysis on a vast array of blocks. For example, an Eigenblock might list all the cars currently owned by Bob's Car Dealership and show the block pointers for the specific transactions. Another example would be to calculate the entire fuel economy of the vehicles generated by XYZ Car Factory. This would permit rapid regulatory audit with the confidence provided by a blockchain with unbreakable encryption. Another example would be the total number of individuals with a cancer-causing gene, or a probability distribution matrix relating death to the gene.

Since Eigenblocks and fields can associate more than one piece of information, they could be linked together to form complex computational networks such as "neural" networks or artificial intelligence. Both the memory of events and the memory of computation on the events can be locked into the QLBCN.

Eigenblocks might refer to a series of blocks that are static after creation, locked into place in the blockchain with a timestamp. It might also refer to blocks in the network that are not chained together but are updated continuously by a set of VNs for dynamic viewing.

The second important concept in the extension of QLBCN's is that of encrypting data in a block in the public ledger and selectively releasing the key to a party for all or part of the data. An example might be having one's entire DNA sequence in a block, scrambled by an OTP key. If the owner of the block wanted to let a medical facility perform a test for a specific gene, they might release the portion(s) of the full key necessary to evaluate the locations of interest. They would only have access to those areas, without being able to see anything else. They might also be given keys to specific Eigenfields in a block, or to all or part of an Eigenblock.

Permissions given for encrypted block data could be granted to Eigenblocks, rescinded later, or have specific expirations. For example, someone participating in a university statistical study on age and car accidents, might provide select key access to Eigenfields in their QLBCN for auto information. The university might have an Eigenblock aggregating the data which automatically performs the calculations. The university could trust that they are seeing valid data related to their study, and the participant could be assured that the university could not see other information like how much they pay for their cars.

The encryption keys scrambling the public ledger might be changed periodically in the same way that VN keys are replaced. New keys would need to be exchanged with legitimate parties—this could be managed automatically. Changing the keys would guard against theft of keys in the same way that changing your credit card number periodically thwarts future fraud.

An individual or organization could release information very selectively using key management and Eigenblocks and fields. An interesting example would be for a company whose financial transactions are recorded via QLBCN, to establish a system of permissions and Eigenfields—such that an Eigenblock contains the matrix of data for SEC financial disclosures. Each transaction would be categorized and tabulated in real time—with the full confidence level provided by the system.

A third key concept is that of "conditional block execution". QLBCN's could be constructed such that new block creation has conditionals controlled by Eigenfields and Eigenblocks (in addition to the standard key exchanges by block owners and VNs). For example, imagine that a foundation stored its funds in a QLBCN crypto currency. The foundation's constitution only permits spending funds on relief work in Africa. The creation of a new block effecting funds transfer from the foundation might require the recipient block owner to have a field operator designating it as related to African relief work. Eigenblocks and fields could also be tied to control of objects in the physical world. Conditional block execution allows for the creation of tightly controlled systems, where the rules can not be changed without proper authorization.

The fourth important concept in the extension of QLBCN's is that of an "Anonymizing Computation Block" or ACB. Imagine that a medical R&D company spent billions of dollars developing a complex algorithm that assigned someone a heart attack risk score based on their DNA sequence and other information. They considered their algorithm to be a trade secret. The algorithm requires analysis of significant amounts of personal data that a consumer might not wish to disclose. An ACB could act as a third-party intermediary performing the algorithm on a consumer's data without having full access to either. The output of an ACB could be recorded and timestamped in a QLBCN, allowing the output to be viewed by other parties with credibility.

First the consumer and the medical company would exchange a protocol for scrambling the private data. It might first involve some form of base analysis to organize the data into a format. Then a random protocol for rearranging the storage of the data would be established. For example, the nucleotide at location 11 on the DNA strand might be stored at location 87 now, and the data from location 4 at 33. Every data address would be mapped to a new address via a completely random key. This would scramble the data such that the ACB owner could not realistically know what it was looking at. An additional OTP XOR operation could be performed on top of that potentially, to make it fully indecipherable. The protocol, address mapping, and decryption key (or combination thereof) would be exchanged via Quantum Lock with the medical company using Eigenblocks in a QLBCN.

The medical company's Eigenblocks would take the secret key exchanged and revise its trade secret algorithm to account for the scrambling. This would then be sent to the third-party entity's ACB. The consumer would grant the ACB permissions to the Eigenblock in their QLBCN holding the newly scrambled data. The ACB would be unable to see the individual's data, and not knowing the format of the data—would have difficulty deciphering the medical company's trade secret. The ACB would perform the algorithm on the data, and then return the score to the medical company and or the individual. As such, an ACB is a powerful tool for protecting the privacy of multiple parties whose data must interact to perform a computation.

Note that if too much data is returned by an algorithm given to an ACB—it could compromise the privacy of the user data. For example, an algorithm returning a 500 bit output after operating on a 500 bit input—might simply be unencrypting the data sent to the ACB. If the ACB sends the output to both parties, then the user can see that the algorithm's output is limited to a simple score that protects their overall privacy. In some instances, a party might be concerned that the form of an algorithm is itself is a trade secret—even without knowing the exact nature of the data inputs. This concern can be addressed by creating an ACB chain where an algorithm is broken into multiple pieces and divided up between independently operated ACBs—much like a computer would break up a computation between parallel processors. In this embodiment, a protocol for breaking up the algorithm would be sent to a primary ACB that would direct the interaction of other independent ACBs, who would each receive their portion of the algorithm independently via Quantum Lock.

The four concepts described above significantly expand the capabilities of QLBCN's (or conceivably an alternate blockchain system). New applications will become possible for protecting privacy, selectively sharing information, performing validations and analysis of secure data, and creating system environments that are tightly constrained by complex validation rules.

Appendix

Part 1:
The following is an example of a message sent through the Quantum Lock hub system.
  Bob wishes to send the message gamma "Quantum Lock" to Alice, for which in binary is:
  01010001  01110101  01100001  01101110  01110100  01110101  01101101  00100000  01001100  01101111  01100011  01101011
  Alice's system address is 000010.
  Bob has Key Serial Device 1010010100111 with 4000 bits of OTP cipher on it; he has used 1000 already.
  The cipher alpha consists of bits 1001 through 1096 (the binary length of gamma) which is 01001100 01101111 01100011 01101011 00100000 01010001 01110101 01100001 01101110 01110100 01110101 01101101
  The positions in binary are 1111101001 and 10001001000.
  Bob XOR encrypts gamma with alpha producing (psi):
11101000110100000001000000101010101000010010000-01100001000001001000010000110110 001011000000110
  Bob creates an id for message psi of 10111.
  Bob sends psi (and its message id) to Alice over the public Internet (or via physical delivery). Neither Alice nor any intercepting party can decrypt the message at this point.
  Bob sends the following message to the hub (or hub network):
1010010100111; 1111101001; 1111101001; 000010; 10111
  Note that there the message protocol to the hub calls for fixed bit lengths for each field so that the hub knows how to delimit the sections of data.
  The hub already has a copy of the KSD cipher (due to copy and physical transport) and can recreate alpha.
  The hub sees that Alice has KSD 1010010100110 with no usage. It creates cipher beta from bits 1 through 96 as follows:
01001100  01101111  01100011  01101011  01010001  01110101  01100001  01101110  01110100  01110101  01101101 00110010
  The hub XOR encrypts alpha with beta creating theta:
11100010010010000010100000011110001101000000001-0001100001011111
  Bob's system address is 000011.
  The hub sends the following message to Alice:
1010010100110;  0000000001;  0001100000;  000011; 10111;  11100010010010000010100000011110001101 00000000100011000010111111
  Alice recreates beta using the KSD serial and cipher positions.
  Alice decrypts theta with beta to get alpha. She knows alpha will decrypt message 10111 from Bob.
  Alice decrypts psi with alpha and gets "Quantum Lock".
Part 2:
The following example QLBCN block was provided earlier:
  Block Network: 22579
  Block ID: 2
  Block Protocol: Version 5.1
  Chain Status: Mid Chain
  TimeStamp: 01/24/19 08:00 GMT
  Prior Block: 1
  Prior Block VNs: For Buyer—847292, For Seller—283382, For Association 293820
  Block Owner: 27382
  Block VN: For Buyer—962145, For Seller—225497, For Association 328495
  Next Block: 3
  Next Block VNs: For Buyer—578213, For Seller—4456812, For Association 2548
  Data: "XYZ Car Factory transfers red SUV, serial 83729289, with odometer 87 miles, to Bob's Car Dealership for $32,100."
An example of one possible network configuration and the interaction with a party confirming the validity of the block:
  Bob's car dealership holds a series of secret OTP keys equal in length to the block. It holds one with each VN in each chain. There are 19 VNs in each of the three chains denoted as ChainName-VN-1, 2, 3 . . . 19. A key held between the Block Owner (Bob's Dealership) and the first VN for the Seller would be denoted as Cipher BlockOwner-ForSellerChain1-VN-1. The rules of the network require complete validation by every VN. Note that as described above, some configurations might have many chains allowing for some chains not to respond or might have a completely different VN configuration. Note that as all communication is Quantum Locked, there is another layer of OTP keys that we are omitting for brevity. Cross linkages to prior or future blocks are also omitted for brevity.

Smith's Accounting Service wants to verify the transaction in the block. It sends a message to Bob's Dealership requesting a composite XOR key for each chain. We'll denote this as ChainName-CompositeKey. Bob's Dealership sends back three keys, one for each chain.

ForBuyerChain1-CompositeKey is equal to Cipher BlockOwner-ForBuyerChain1-VN-1 XOR Cipher BlockOwner-ForBuyerChain1-VN-2 XOR Cipher BlockOwner-ForBuyerChain1-VN-3 . . . . XOR Cipher BlockOwner-ForBuyerChain1-VN-19; the composite keys for the other chains are calculated in the same manner.

Smith's Accounting sends the block in question to each of publicly known VNs listed in the block (that are the beginning of a VN chain.

The VNs at the beginning of each chain XOR the block with their respective secret key held with the block owner and then send this on to the next VN in the chain. The final VN (19) knows it is the end of the chain for that block, and sends the block encrypted via 19 XOR keys to Smith's Accounting.

Note that as described above, some embodiments of VN configurations may call for each VN to send their response back directly to the party making the query.

Smith's Accounting then takes ForBuyerChain1-CompositeKey and performs a XOR encryption on the code coming back from ForBuyChain1. If it decrypts to the public block—then that means that chain has validated that specific block. If the other chains also validate it, then Smith's Accounting can assume the block to describe a real transaction. If any VN uses a corrupted key, then it will cause a mismatch with the composite key. Note that in many QLBCNs, protocols would exist to make a decision if conflicting "votes" are returned by the VNs or VN chains.

All keys held between the VNs and the block owner (and potentially between other VNs and other blocks) would be replaced immediately after the query. This could be done by incrementing to a new portion of a large cipher.

Note that because communication in the system uses Quantum Lock OTP, and the block ciphers are based on OTP—it is not possible to use brute force or quantum computation to compromise the system. Given a significant number of VNs and blocks of any length—the chances of randomly stumbling on a block owner's ciphers are almost infinitely small. Likewise, the number and configuration of the VNs can guard against collusion, hacking, or coercion by a bad actor.

Part 3:
The following are examples of simple Eigenfields. Unrelated block fields are omitted for brevity.
 Block: 837
 Data: ACGTAACTG . . . GACT
 Eigenfield 8 (presence of cancer gene 73): Positive Block: 8172
 Data: Debt—$17,281; Annual Income—$71,738; Assets—$351,002
 Eigenfield 2 (Debt to Income Ratio): 24%

The following is an example of an Eigenfield that pulls its algorithm from another block:
 Block: 17
 Data: Name—John Smith; Age—27; Accidents—4; Ticket Points—3
 Eigenfield 9 (Auto Insurance Risk Score): Pointer-Block 13; Score 102
 Block: 13
 Data: Eigenfield 9 Algorithm—(80-Age)+Accidents*10+ Points*3

The following are examples of Eigenblocks:
 Block: 36
 Data: This block calculates the average height of subjects in a sample population group denoted by Eigenfield 11 set to 1. Average height 5'6".
 Block: 1
 Data: Name—Jane Doe; Weight-110; Height 5'0"
 Eigenfield 11: 0
 Block: 2
 Data: Name—John Doe; Weight—210; Height 6'0"
 Eigenfield 11: 1
 Block: 3
 Data: Name—Jane Smith; Weight—100; Height 5'0"
 Eigenfield 11: 1

The following is an example of scrambling the data in a public ledger block and selectively releasing the OTP cipher key to protect privacy:
 Block: 8
 Data: John Smith; Financial History—10110111011101101010110101; Employment History—101110001011101011101001; Medical History—011011101010101011111100
 Parties with access to the public ledger might be able to see portions of the blocks, and can place faith in the construction of the network and its verifier configurations, but can not see scrambled portions of the data.
 If John Smith wants to release his financial history to a bank, but not the medical or employment data—he would send the following cipher (specific to the financial portion):
10010000110101001101000010111011101110100010- 000100
This XOR decodes to:
10010000110101001101000010110000110011001100100- 0110001 which in text is $54,321.
 The cipher might be sent directly, or a VN representing John Smith might send it to the bank or their VN representative. The cipher might be valid for a part of a single block or provide access to all or portions of a series of blocks related to the data of interest. In some embodiments, the ciphers would be changed following a release of data.

The following is an example of Conditional Block Execution:
 Block: 1
 Data: African Relief Trust cryptocurrency fund balance is $1.7 M.
 Conditional Rules: Funds transfer must be to QLBCN recipients with Eigenfield 98 value of 1 denoting their involvement in African relief work.
 African Relief Trust attempts to transfer $0.4 M to an Asian orphanage whose Eigenfield 98 value is 0. The block creation VNs are unable to process the transaction because of the conditional rules.

Then they attempt to transfer $0.6 M to a Nigerian orphanage whose Eigenfield 98 value is 1. The VNs are able to process this, and create new blocks showing the cryptocurrency transaction to the orphanage and African Relief Trust's remaining $1.1 M.

The following is an example of Anonymizing Computational Blocks:

Consumer Jane Doe's purchase history is stored in a QLBCN. An Eigenblock summarizes the vacation purchases for the last year into simple categories. The Eigenblock algorithm might be sent over by a third party or be basic to the QLBCN.

Block: 63

Data: Jane Doe purchase history categorizations for 2018; Total Theme Park Expenditures=$4,000; Total Cruise Expenditures=$3,000; Total Non-Cruise Travel Expenditures=$14,000

Cruise Marketers Inc wants to determine if it would be worthwhile to send Jane Doe advertising for cruises. She does not want to release her specific purchase history, and the firm does not want anyone to know their secret algorithm for finding target customers.

Cruise Marketers sends Jane Doe (or VNs representing her) a data scramble map: Map field 1 to 3, 2 to 1, and 3 to 2.

Jane Doe scrambles the data fields so they are now $3,000; $14,000; $4,000. She is instructed to send these to the ACB run by Anonymous Computation Inc.

Cruise Marketers sends the ACB this algorithm:

If field 3<5,000 and If field 1<8,000, and if field 2>10,000

The ACB performs the calculation and returns a 1 meaning that Jane Doe is a good marketing target. The ACB does not know what the data fields are and might not even know what the purpose of the computation is. Multiple ACBs could be used if more secrecy is required regarding the form of the algorithm. All communications are transmitted using Quantum Lock to maintain secrecy. Jane Doe has maintained her privacy, Cruise Marketer's trade secret is protected, and yet the two parties have completed an important economic transaction.

The invention claimed is:

1. A method of linking a growing list of records, comprising the steps of:
   (a) defining blocks of information (blocks) with lengths having fields for verification entities (verifier nodes or VNs), one or more of the entities being responsible for ownership of the information of a block (block owner(s)), a unique block ID, and IDs for one or more other blocks (linked blocks);
   (b) establishing a system (the network) to oversee block interaction and designation and dissemination of trusted blocks in archives (the ledger versions)
   (c) secretly exchanging, by the block owners, an OTP (one-time-pad) verification key equal in length with the block, with each VN being assigned to that block;
   (d) verifying the authenticity of the information in a block and its owner (authentication request), and wherein this authentication request is performed by a network user (the query sender) sending a query to a block owner requesting the verification key for that block;
   (e) transmitting, by the block owner, the block owner key to the query sender;
   (f) sending a message by the query sender to the VNs assigned to the block requesting the block data encrypted with their corresponding verification key;
   (g) sending the data requested in (f) by the VN to the query sender;
   (h) decrypting, by the query sender, the data sent by the VN in (g) using the corresponding verification key from the block owner; and
   (i) wherein, if all decrypted data in h matches the ledger versions of a block, confirming the authenticity of the block data and the block owner.

2. The method of claim 1, wherein a field of data (Eigenfield) within a block has a value calculated based on other data in the block using information contained in one or more other fields.

3. The method of claim 2, wherein the value of an Eigenfield at a particular moment in time is recorded permanently as part of a ledger, or forms part of a dynamic calculation when queried.

4. The method of claim 2, wherein an algorithm determining the value of the Eigenfield is stored in another block, changes over time, or is based on data fields in other blocks.

5. The method of claim 2, including the step of creating a cloned version of a block with a timestamp when a change in the value of an Eignefield occurs.

6. The method of claim 3, including the step of defining an Eigenblock as an array of Eigenfields calculated from data in other blocks.

7. The method of claim 6, including the step of continuously cloning an Eigenblock in a network with timestamps, thereby creating a history of aggregated data values or computation of data at specific times.

8. The method of 6, wherein the VNs are used to perform calculations associated with the creation of Eigenfields or Eigenblocks, or wherein the VNs generate data or algorithms which are supplied to Eigenfields or Eigenblocks.

9. The method of claim 6, wherein:
   the value of an Eigenfield at a particular moment in time is recorded permanently as part of a ledger; and
   the data in the ledger is encrypted with an OTP cipher (SDM key) for all or part of an Eigenfield or Eigenblock or other data fields (selective data masking or SDM).

10. The method of claim 9, including the step of storing the SDM keys by VNs or a by a block owner, and are released selectively with the permission of a block owner.

11. The method of claim 9, including the step of releasing the SDM keys to Eigenfields or Eigenblocks.

12. The method of claim 9, including the step of changing the SDM keys at time intervals or triggered by events.

13. The method of claim 6, wherein an Eigenfield or Eigenblock controls the creation of a block.

14. The method of claim 9, wherein an Eigenfield or Eigenblock exchanges information or commands external to the network.

15. The method of claim 9, wherein an Eigenfield or Eigenblock controls objects in the physical world (conditional block execution or CBE).

* * * * *